(12) United States Patent
Gbordzoe et al.

(10) Patent No.: US 11,235,301 B1
(45) Date of Patent: Feb. 1, 2022

(54) SYSTEMS AND METHODS FOR IMPROVING FEED CATALYST CONTACTING IN DOWNFLOW REACTORS

(71) Applicant: Technip Process Technology, Inc., Houston, TX (US)

(72) Inventors: Eusebius Anku Gbordzoe, Houston, TX (US); Alexander Maller, Houston, TX (US)

(73) Assignee: Technip Process Technology, Inc., Houston, TX (US)

( * ) Notice: Subject to any disclaimer, the term of this patent is extended or adjusted under 35 U.S.C. 154(b) by 0 days.

(21) Appl. No.: 16/930,735

(22) Filed: Jul. 16, 2020

(51) Int. Cl.
*B01J 8/00* (2006.01)
*B01J 8/18* (2006.01)

(52) U.S. Cl.
CPC ............. *B01J 8/003* (2013.01); *B01J 8/008* (2013.01); *B01J 8/1827* (2013.01); *B01J 8/1872* (2013.01); *B01J 8/1881* (2013.01); *B01J 2208/0084* (2013.01); *B01J 2208/00902* (2013.01); *B01J 2208/00929* (2013.01); *B01J 2219/00772* (2013.01)

(58) Field of Classification Search
CPC . B01J 8/003; B01J 8/008; B01J 8/1881; B01J 8/1872; B01J 8/1827; B01J 2208/0084; B01J 2208/00902; B01J 2208/00929; B01J 2208/00772; B01J 2208/0077
See application file for complete search history.

(56) References Cited

U.S. PATENT DOCUMENTS

| | | | |
|---|---|---|---|
| 6,186,658 B1 | 2/2001 | Nishida et al. | |
| 8,101,132 B2 * | 1/2012 | Fujiyama | B01J 8/003 422/214 |
| 9,446,368 B2 * | 9/2016 | Shimada | B01J 8/245 |

FOREIGN PATENT DOCUMENTS

CN 109666503 A 4/2019

* cited by examiner

*Primary Examiner* — Lessanework Seifu
(74) *Attorney, Agent, or Firm* — Locke Lord LLP; Alan B. Clement

(57) ABSTRACT

A downflow reactor, e.g. a downer reactor or system, includes an outer wall defining an interior reactor space. An elongated plug is within the outer wall having a first end and a second end, defining a longitudinal axis between the first and second ends. A distribution baffle positioned at a vertical position between the first end and the second end of the elongated plug configured and adapted to direct hot down flowing catalyst towards a feedstock spray.

23 Claims, 9 Drawing Sheets
(3 of 9 Drawing Sheet(s) Filed in Color)

SYSTEMS AND METHODS FOR IMPROVING FEED CATALYST CONTACTING IN DOWNFLOW REACTORS

BACKGROUND

1. Field

The present disclosure relates to the efficiency of mixing a catalyst and feedstock together, specifically to mixing a hot catalyst with a hydrocarbon feedstock in a downflow reactor.

2. Description of Related Art

Fluid Catalytic Cracking (FCC) is a commonly-used process in oil refineries that produces high yields of gasoline and liquefied petroleum gas (LPG), propylene and other products which serve as feedstock for the petrochemical industry, which are in a high demand in the United States, and throughout the world. Despite the long existence of the FCC process, techniques are continually sought for improving product conversion and yield selectivity of high value products.

The conversion a FCC feedstock to product occurs in a reactor system where hot catalyst is contacted with an injected hydrocarbon feed. This reaction can be carried out in an upward flowing riser-reactor system or in a downward flowing downflow reactor (DFR) or downer system where the catalyst and vapors are flowing in the direction of gravity. The downward flowing reaction systems is amenable to high propylene and high conversion to light olefin product because it operates at high severity in terms of temperature and Cat/Oil for a short contact time between the catalyst and feed.

In the DFR section of high-severity-FCC (HS-FCC™) systems, a discrete number of feed nozzles are used to inject a feedstock, e.g. a hydrocarbon feed, into downward flowing hot catalyst from a regenerator. The coverage of the spray from the feed nozzles tends to be limited, leaving areas around the internal periphery of the DFR where the hot catalyst bypasses the feed spray, as shown by the green color on the periphery of the reactor wall in FIG. 7A. The DFR generally includes a center plug which causes the downflowing hot catalyst to form into an annular flow pattern in the feed zone. When it ends, the hot catalyst tends to bypass the feed spray in the center of the feed zone, as shown by the central green portion in FIG. 7A. The net effect of catalyst bypassing is retarding the rapid vaporization of the feed. Considering that the total vapor residence time in the DFR ranges from 0.5 to 1 second, it is important that the feed be completely vaporized within 0.2 seconds. Any portion of the feed not vaporized in the feed zone could remain partially vaporized at the end of the DFR representing loss in feed conversion to desired products.

In the fully developed regime of the DFR, the hot catalyst is traveling slightly faster than the gas feed and the catalyst profile across the DFR can result in a core annular flow with higher concentration of hot catalyst flowing along the wall as shown in FIG. 7A. The central flow of the catalyst as well as the peripheral bypass acts to reduce the effective mixing of catalyst and feedstock leading to poor DFR performance, reduced conversion of feedstock to valuable product such as LPG and light olefins and increased thermal cracking as compared to the desired catalytic cracking.

In CN109666503A, a downer and catalytic conversion method is described. The downer reactor (1) includes an inner wall of the main reaction section (16) having an annular baffle (14) coaxial with the main reaction section (16). See CN109666503A, Abstract. CN109666503A, however, does not address catalyst and vapor mixing inefficiencies in the feed zone caused by catalyst bypassing and the large mixing volume in the feed zone. Moreover, CN109666503 does not include a plug, nor is the baffle positioned optimized in relation to other components of the system.

The conventional techniques have been considered satisfactory for their intended purpose. However, there is an ever present need for improved systems and methods which can better convert hydrocarbon feedstocks into products such as LPG and/or olefins. This disclosure provides a solution for this need.

SUMMARY

A downflow reactor includes an outer wall defining an interior reactor space. An elongated plug is within the outer wall having a first end and a second end, defining a longitudinal axis between the first and second ends. A distribution baffle positioned at a vertical position between the first end and the second end of the elongated plug configured and adapted to direct hot down flowing catalyst towards a feedstock spray.

In some embodiments, the distribution baffle includes a converging section and a constant-area section. The converging section can converge from an upstream end of the distribution baffle towards a downstream end of the distribution baffle. An upstream end of the distribution baffle can be mounted to an interior surface of the outer wall. The distribution baffle can be integrally formed with the outer wall. The distribution baffle can be formed from at least one of a refractory material or a metallic material. The first end of the elongated plug can have a first diameter and the second end of the elongated plug can have a second diameter. The second diameter can be greater than the first diameter and the second end can be positioned downstream from the first end.

In certain embodiments, the downflow reactor includes at least one feed nozzle positioned on a perimeter of the outer wall configured to spray a feedstock into the interior reactor space. The second end of the elongated plug can terminate at a vertical position below an outlet of the at least one feed nozzle configured and adapted to minimize hot segregated catalyst flow along the elongated plug. The at least one feed nozzle can define a respective central injection axis. The respective central injection axis can intersect an exterior surface of the second end of the elongated plug.

The downflow reactor can include a mixing baffle positioned at a vertical position below a terminal end of the second end of the elongated plug. The outer wall can define an upstream cylindrical portion and a diverging section downstream from the upstream cylindrical portion. The mixing baffle can be positioned at least partially within the diverging section of the outer wall. The mixing baffle can be integrally formed with the outer wall. The mixing baffle can be formed from at least one of a refractory material or a metallic material. An upstream end of the mixing baffle can be mounted to an interior surface of the diverging section of the outer wall. The downflow reactor can include at least one distributor (e.g. nozzle, conduit, pipe, or the like) positioned within the mixing baffle and/or in abutment with the mixing baffle. The at least one distributor can be configured and adapted to supply at least one of steam, vapor, gas or hydrocarbon feed into the downflow reactor. The mixing baffle can be frustoconical and converges in a downstream direction toward a central axis of the outer wall.

The downflow reactor can include at least one lower baffle positioned at a vertical position below the diverging section of the outer wall. The at least one lower baffle can be frustoconical and converges in a downstream direction toward a central axis of the outer wall. The at least one lower baffle can be integrally formed with the outer wall. The at least one lower baffle can be formed from at least one of a refractory material or a metallic material. The downflow reactor can include at least one distributor (e.g. nozzle, conduit, pipe, or the like) positioned within the lower baffle and/or in abutment with the mixing baffle. The at least one distributor can be configured and adapted to supply at least one of steam, vapor, gas or hydrocarbon feed into the downflow reactor. The at least one lower baffle can be a plurality of lower baffles positioned at different vertical positions along the outer wall, each at a vertical position below the diverging section of the outer wall.

In some embodiments, the elongated plug defines an exterior surface where the exterior surface includes at least one projection extending therefrom. The at least one projection can be a series of helical vanes. The elongated plug can define a fluid path through a hollow portion of the plug. The fluid path can begin at a first end of the plug and terminates at a second end of the plug for injection of steam and/or hydrocarbon feedstock into the interior reactor space. The first end of the elongated plug can have a first diameter and the second end of the elongated plug can have a second diameter. The second diameter is greater than the first diameter and wherein the second end is positioned downstream from the first end, wherein the at least one projection extends from the exterior surface on the second end.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures. Additionally, the patent application file contains at least one drawing executed in color. Copies of this patent or patent application publication with color drawings will be provided by the Office upon request and payment of the necessary fee.

DETAILED DESCRIPTION

Figure 1:
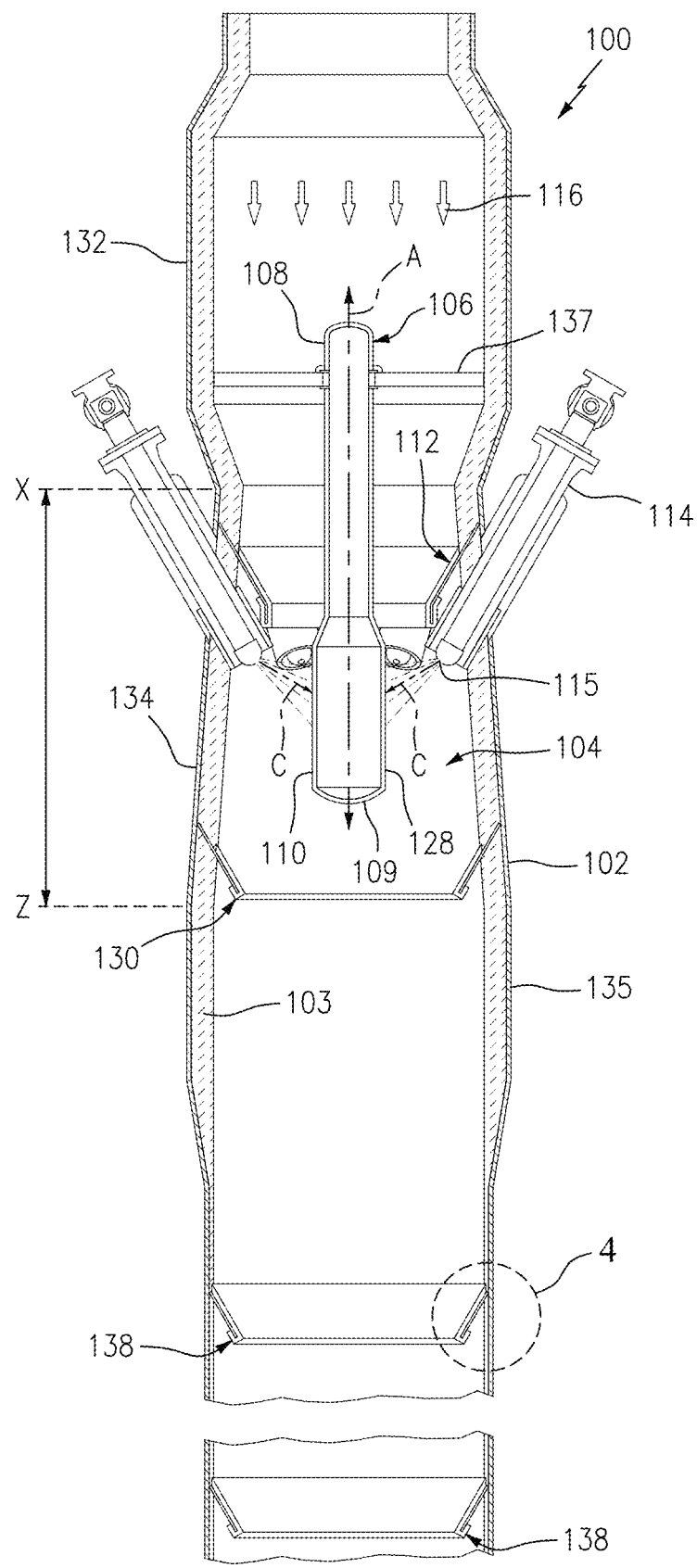
FIG. 1 is a schematic cross-sectional view of an embodiment a downflow reactor constructed in accordance with the present disclosure, showing a centrally located plug and a distribution baffle positioned within an outer wall of the reactor.

Reference will now be made to the drawings wherein like reference numerals identify similar structural features or aspects of the subject disclosure. For purposes of explanation and illustration, and not limitation, an illustrative view of an embodiment of a downflow reactor is shown in FIG. 1 and is designated generally by reference character 100. Other embodiments of systems in accordance with the disclosure, or aspects thereof, are provided in FIGS. 2-11, as will be described. Embodiments of the downflow reactor described herein can be used to (i) provide enhanced mixing intensity between a catalyst and a hydrocarbon feed, (ii) improve conversion and selectivity to more valuable products such as olefins, (iii) eliminate/minimize hot catalyst bypassing of feed in the feed zone, thus increasing the effective catalyst to oil ratio, and (iv) ensure catalyst and vapor are at approximately identical temperatures leaving the downflow reactor. Embodiments of the present disclosure provide improved mixing of hot catalyst with a hydrocarbon feedstock in downflow reactor 100 to maximize hot catalyst utilization to enhance feed vaporization and conversion.

Figures 5, 6:
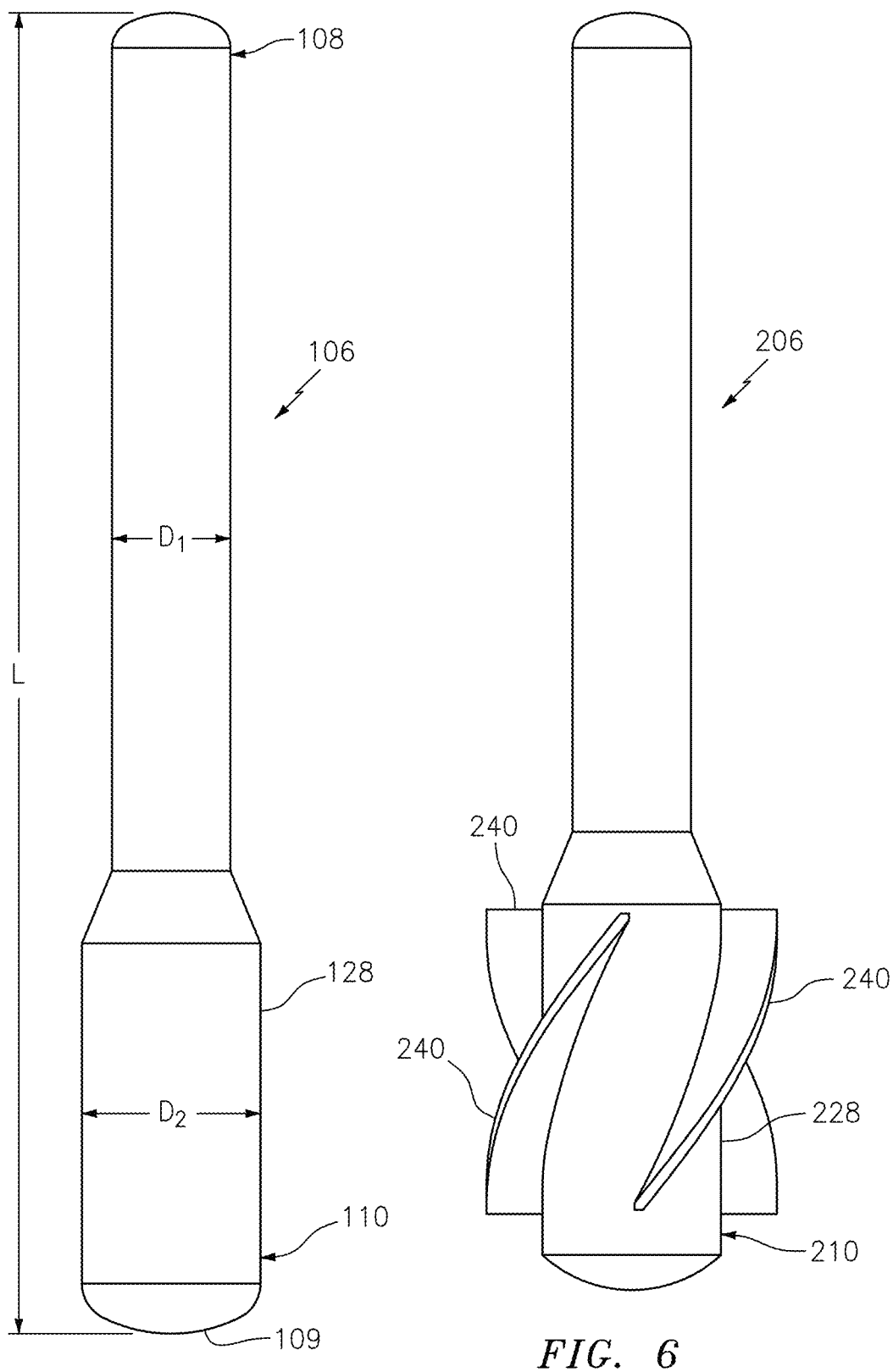
FIG. 5 is a schematic side plan view of a plug of the downflow reactor of FIG. 1, showing the varying diameters along the length of the plug.
FIG. 6 is a schematic side plan view of another embodiment of a plug constructed in accordance with the present disclosure, showing projections extending outward from an exterior surface of the plug.

As shown in FIGS. 1 and 5, downflow reactor 100 (e.g. a downer reactor or system) includes an outer wall 102 defining an interior reactor space 104. Outer wall 102 is generally cylindrical and defines a central axis Y. Outer wall 102 is lined with a refractory material 103 to protect the outer wall 102 from thermal degradation and erosion. An elongated plug 106 is within the outer wall 102 having a first end 108 and a second end 110, defining a longitudinal axis A between the first and second ends. The second end 110 is positioned downstream from the first end 108. The first end 108 of the elongated plug 106 has a first diameter $D_1$ and the second end 110 of the elongated plug 106 has a second diameter $D_2$. The elongated plug 106 is mounted to outer wall via mounting arms 137 extending from the first diameter $D_1$ portion. The second diameter $D_2$ is greater than the first diameter $D_1$. The start of the feed zone corresponds to a vertical position 141 where the catalyst meets a distribution baffle 112, described in more detail below. The feed zone generally ends at the intersection of diverging section 134 and a downstream cylindrical section 135 (at vertical position Z). The second diameter $D_2$ is designed to optimize hydrocarbon spray penetration into the downwardly flowing catalyst and to have a good balance between catalyst velocity and spray momentum. The larger diameter $D_2$ relative to diameter $D_1$ reduces the mixing volume in the feed zone as well as maintains an annular catalyst flow to the feed nozzles 114.

With continued reference to FIGS. 1 and 5, the catalyst flowing along the elongated plug 106 around diameter $D_1$ is spread out towards the feed nozzles 114 when it impacts the portion of plug with diameter $D_2$. In some embodiments, the ratio of $D_1$ to $D_2$ is 0.3 to 1. The ratio of $D_2$ to an inner diameter of outer wall 102 ranges from 0.1-0.4. The ratio of $D_1$ to $D_2$ defines the catalyst velocity flowing downwards at the same time it sets the penetration distance for the spray from the feed nozzles 114. The increased length L of plug 106, as compared with traditional plugs, ensures that catalyst leaving the feed zone has already contacted the feed from feed injectors even if some catalyst flows along the wall of the plug 106. In this way, the plug 106 does more than maintain annular flow, it helps optimize the mixing volume and promote catalyst oil mixing. The plug 106 design can take various shapes with or without vanes or extensions with the purpose of enhancing mixing of hot catalyst and feed and reducing catalyst tendency to flow along the outer surface of the plug 106.

With continued reference to FIG. 1, feed nozzles 114 are positioned on a perimeter of the outer wall 102 configured to spray a hydrocarbon (oil) feedstock into the interior reactor space 104. Traditional plugs generally terminate above or at the same vertical position as feed nozzles 114. On the other hand, the second end 110 of the elongated plug 106 terminates at a vertical position below an outlet 115 of the at least one feed nozzle 114 resulting in minimized hot segregated catalyst flow along the elongated plug 106 and making the plug 106 an integral part of the mixing zone design. Each feed nozzle 114 defines a respective central injection axis C. The respective central injection axis C intersects an exterior surface 128 of the second end 110 of the elongated plug 106. In certain embodiments, plug 106 ends at a vertical position equal to minus 0.8 to 1.5 times $D_2$ below the projected feed spray intersection.

Figure 11:
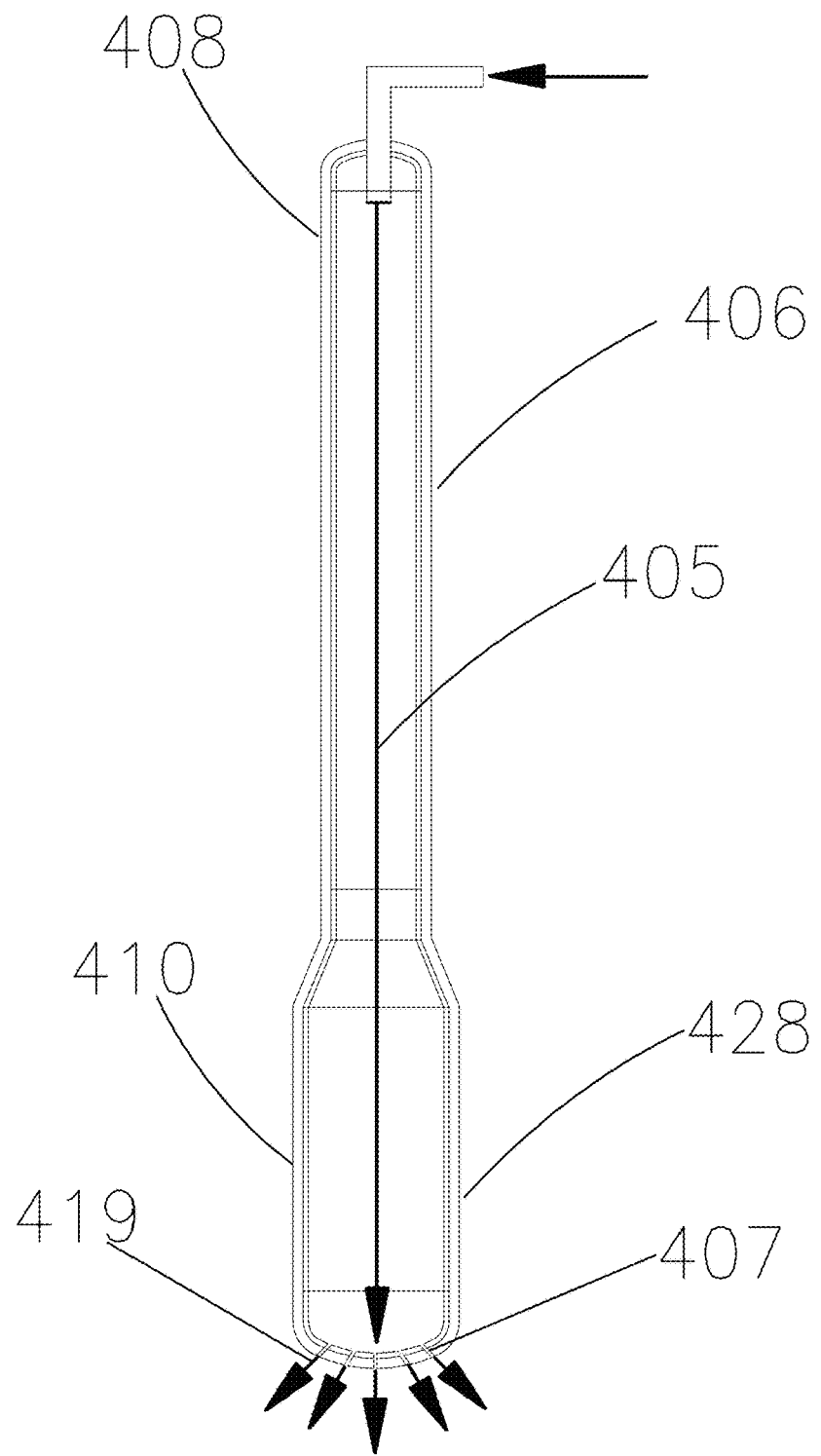
FIG. 11 is a schematic cross-sectional view of another embodiment of a plug constructed in accordance with the present disclosure, schematically showing an interior fluid path from a first end to a second end of the plug.

As shown in FIG. 11, another embodiment of a plug 406 is shown with a fluid path 405 through a hollow portion of the plug 406. The plug 406 is similar to the plug 106 except that plug 406 has fluid path 405 entering at a first end 408 and distributor 407 at a second end 410 to allow for injection of steam and/or hydrocarbon feedstock into an interior reactor space (similar to interior reactor space 104). Plug 406 can similarly be used within reactor 100. Fluid path 405 is in fluid communication with a feedstock or steam source from outside of reactor 100, which is piped in through a pipe/conduit, or the like. Distributor 407 is shown with a series of outlets where steam and/or hydrocarbon feedstock is injected into the feed zone of reactor 100 (shown schematically by downwardly directed arrows 419).

Figure 2:
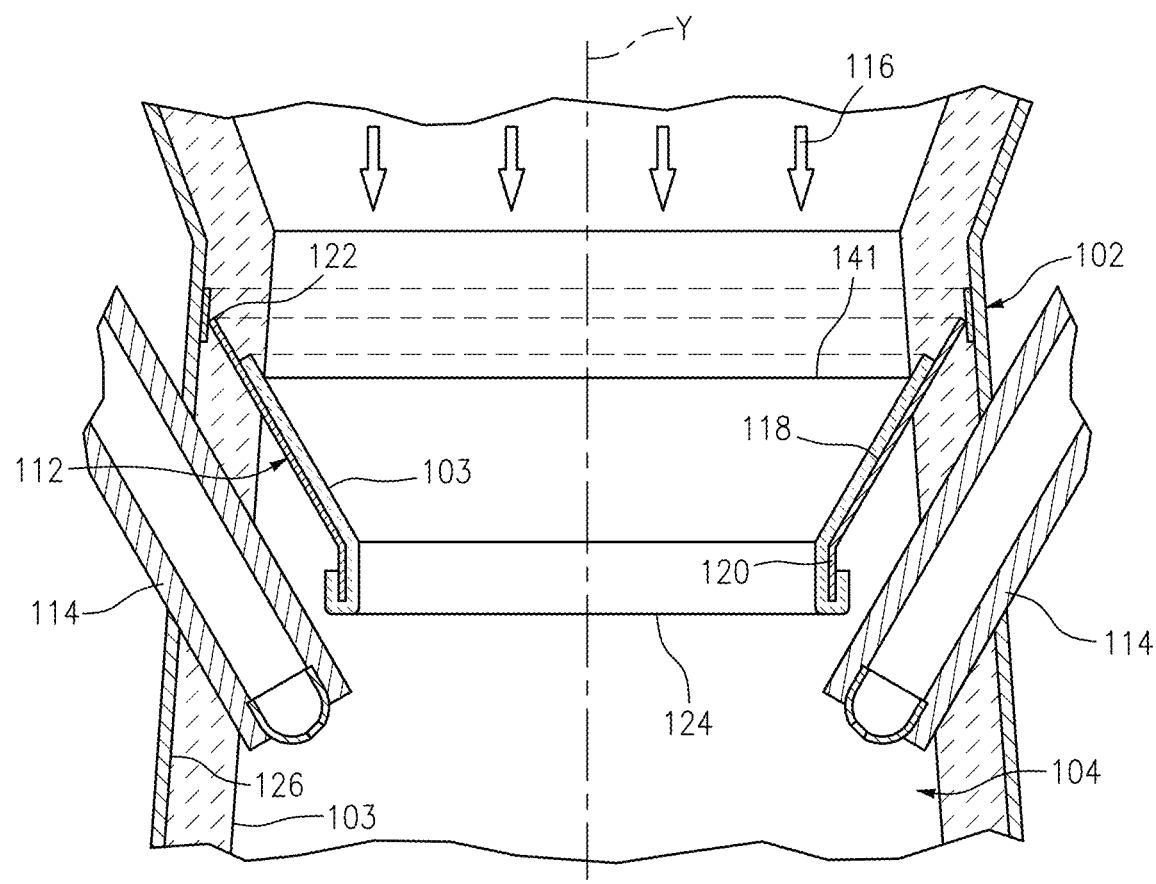
FIG. 2 is a schematic cross-sectional view of the distribution baffle of the downflow reactor of FIG. 1, showing the upstream end of the baffle mounted to the interior surface of the outer wall.

As shown in FIGS. 1 and 2, a distribution baffle 112 positioned at a vertical position along central axis Y between the first end 108 and the second end 110 of the elongated plug 106 configured and adapted to direct hot down-flowing catalyst, schematically indicated by a series of downwardly pointing arrows 116, towards a feedstock spray being introduced at feed nozzles 114. The hot catalyst inlet temperature varies from 1260° to 1330° F. The distribution baffle 112 is a protrusion extending inwardly toward central axis Y from outer wall 102 and includes a converging section 118 and a constant-area skirt section 120. Distribution baffle 112 is metallic, e.g. made from stainless steel, or the like, and is similarly coated in a refractory material 103. The converging section 118 converges from an upstream end 122 of the distribution baffle 112 towards a downstream end 124 of the distribution baffle 112. The upstream end 122 of the distribution baffle 112 is mounted to an interior surface 126 of the outer wall 102. The distribution baffle 112 acts to direct hot down flowing catalyst towards the feed spray from nozzles 114 resulting in increased contact with the feed and thereby increased feed vaporization. The feedstock inlet temperature at nozzles 114 depends on feed type, but generally varies from 400° to 600° F. While distribution baffle 112 is described as having a converging section and constant area skirt section, it is contemplated that baffle 112 can have a variety of suitable shapes, while still achieving the directing objectives described above.

With continued reference to FIGS. 1 and 2, the converging distribution baffle 112 together with the enlarged and lengthened plug 106 minimize the reactor 100 volume and intensifies mixing of hot catalyst and feed, further resulting in increasing the speed of feed vaporization as the feed is rapidly vaporized (within 0.2 seconds) and diffused into the catalyst pores where reaction takes place. Rapid catalyst oil mixing and the resulting near isothermal conditions provide minimal hot catalyst bypassing the feedstock, which increases the effective utilization of catalyst and hydrocarbon feedstock. The number, type, shape, length and angle of the distribution baffle 112 can be optimized depending on the application.

Figure 3:
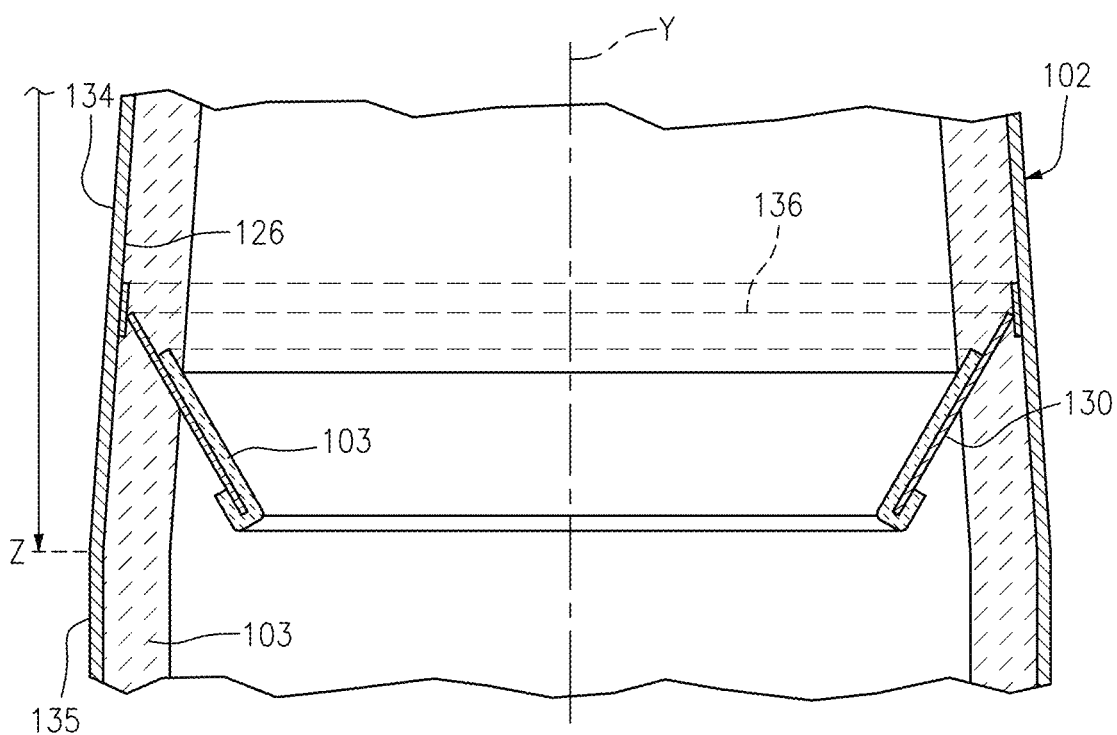
FIG. 3 is a schematic cross-sectional view of a mixing baffle of the downflow reactor of FIG. 1, showing the mixing baffle mounted to the interior surface of the outer wall.

As shown in FIGS. 1 and 3, the downflow reactor 100 includes a mixing baffle 130 positioned at a vertical position below a terminal end 109 of the second end 110 of the elongated plug 106. The outer wall 102 defines an upstream cylindrical portion 132 and a diverging section 134 downstream from the upstream cylindrical portion 132. Diverging section 134 is generally defined between vertical positions X and Z. The mixing baffle 130 is a protrusion positioned at least partially within the diverging section 134 that extends inwardly from the outer wall 102. Mixing baffle 130 is metallic, e.g. is made from stainless steel, or the like, and is similarly coated in a refractory material 103. An upstream end 136 of the mixing baffle 130 is mounted to interior surface 126 of the diverging section 134 of the outer wall 102. The mixing baffle 130 is frustoconical and converges in a downstream direction toward central axis Y of the outer wall 102. It is contemplated, however, that other embodiments of mixing baffle 130 can have a variety of other shapes. In addition to mixing in the feed zone, the mixing baffle 130 aids in moving catalyst flowing along the wall which might otherwise bypass the feedstock vapor to contact the feedstock vapor, resulting in reduced thermal cracking and increased catalytic cracking. The type, shape, location length and angle of the mixing baffle 130 can be optimized depending on the application.

With continued reference to FIGS. 1-3, the increased length and diameter of the plug 106, as compared with traditional plugs, and the inclusion of converging distribution baffle 112 and mixing baffle 130, acts to eliminates/minimize hot catalyst bypassing of feed in the feed zone. and redirects hot catalyst flowing along the reactor 100 wall below the feed zone into the main gas vapor flow path for additional catalytic cracking. These elements also ensure that catalyst and vapor are at approximately identical temperatures leaving the downer reactor 100 thus, ensuring that the effective catalyst to oil ratio is optimized. The outlet temperature for downer reactor 100 varies from 1080° to 1200° F. The propylene yield depends on feedstock and operating conditions and can vary from 16 wt % to above 20 wt %.

Figure 4:
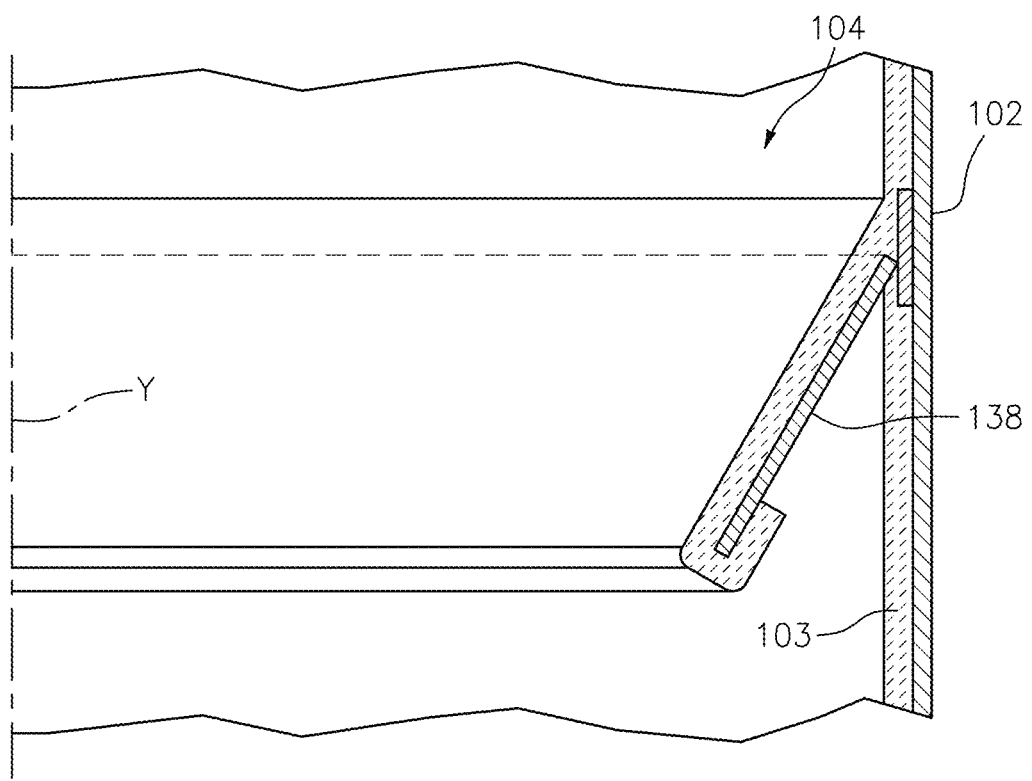
FIG. 4 is a schematic cross-sectional depiction of a portion of the lower baffle of the downflow reactor of FIG. 1, showing the lower baffle mounted to the interior surface of the outer wall.

With reference now to FIGS. 1 and 4, the downflow reactor 100 includes a plurality of lower baffles 138, e.g. lower mixing baffles, positioned at a vertical position below the diverging section 134 of the outer wall 102. Each lower baffle 138 is frustoconical and converges in a downstream direction toward central axis Y of the outer wall 102. Each lower baffle 138 is metallic, e.g. made from stainless steel, or the like, and is similarly coated in a refractory material 103. Lower baffles 138 are strategically positioned at different vertical positions along the outer wall 102, each at a vertical position below the diverging section 134 of the outer wall 102. Each baffle 138 is a protrusion that extends inwardly from outer wall 102 toward central axis Y. While a plurality of lower baffles 138 are shown, it is contemplated that a single lower baffle 138 may be used. The natural tendency of two phase vapor-catalyst flowing downwards within reactor 100 under gravity is for the catalyst to migrate towards the outer wall 102 and flow downwards along the wall. This segregation represents loss in catalyst and hydrocarbon contacting which lowers the potential for hydrocarbon to contact the catalyst to convert to lighter valuable product. The mixing baffles, mixing baffle 130 and lower baffles 138, are used to re-direct catalyst flowing along the wall towards the center of the reactor 100 to promote additional catalyst vapor contacting and increase conversion. It also reduces the amount of hot catalyst bypassing and this improves the effective catalyst to oil ratio. Additionally, while mixing baffles 130 and lower baffles 138 are shown frustoconically, it is contemplated that, in some embodiments, a variety of baffle shapes can be used to provide similar redirection, reduced bypass, and/or increased mixing between catalyst and feedstock vapors. The number, type, shape, length, position and angle of the lower baffle 138 can be optimized depending on the application. Mixing baffle 130 and lower baffles 138 (also mixing baffles) are incorporated to increase the mixing intensity between the hot catalyst and hydrocarbon feedstock to enhance rapid feed vaporization and conversion into valuable products.

Figure 10:
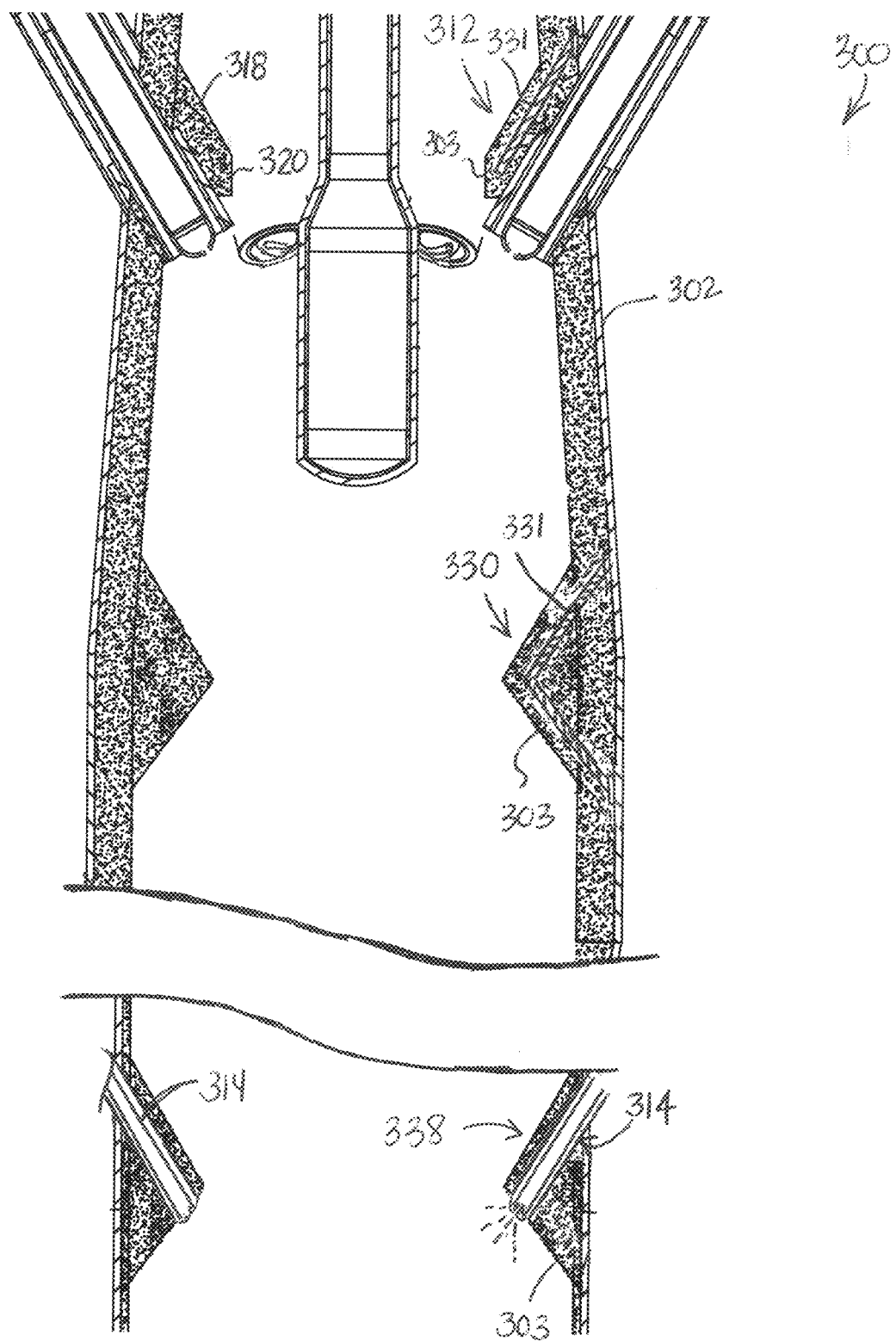
FIG. 10 is a schematic cross-sectional view of another embodiment a downflow reactor constructed in accordance with the present disclosure, showing a centrally located plug, and a distribution baffle, a mixing baffle and a lower baffle, each formed by a respective portion of the interior refractory material of the outer wall.

As shown in FIGS. 1 and 6, in certain embodiments, an elongated plug 206 includes at least one projection 240 extending therefrom. Otherwise, elongated plug 206 is the same as elongated plug 106. The projections 240 extend from an exterior surface 228 of the second end 210 of elongated plug 206. In the embodiment of FIG. 6, projections 240 are shown as a series of helical vanes circumferentially spaced apart around the cylindrical perimeter of the elongated plug 106. However, it is contemplated that a variety of suitable projections could be used. With reference now to FIG. 10, another embodiment of a downflow reactor 300 is shown.

Reactor 300 is the same as reactor 100 except that instead of having baffles 112, 130 and 138 formed mostly by a metallic projection welded to outer wall 102, reactor 300 includes baffles 312, 330 and 338 that are mostly formed by refractory material 303 integral with the other refractory material 303 along the inner diameter surface of the outer wall 302 (or a section thereof). Within the refractory baffles 312, 330 and 338 are respective metallic supports 331. The metallic supports 331 are welded to wall 302 and can be continuous circumferential supports or can be spaced apart circumferentially. The cross-sectional profile for each support can mirror that of its respective baffle, e.g. for baffle 330, the metallic support 331 forms a triangular projection. However, it is contemplated that a variety of suitable support projections could be used.

With continued reference to FIG. 10, in some embodiments, baffles 330 and 338 can also include staged steam injection or hydrocarbon feed injection capability through distributors 314, e.g. baffle nozzles, conduits, pipes, or the like. The distributors 314 are configured and adapted to supply at least one of steam, vapor, gas or hydrocarbon feed into the downflow reactor. Distributors 314 are positioned circumferentially about outer wall 304 and can alternate circumferentially with metallic supports 331. While distributors 314 are shown in lower baffle 338, it is contemplated that distributors 314 can readily be integrated within and/or in abutment with baffles 112, 312, 130, 330 or 138. Refractory baffles 312, 330 and 338 have similar functions and advantages as baffles 112, 130 and 138 as described above. Distribution baffle 312 is similar to baffle 112 in that it too has a converging section 318, similar to converging section 118 and a constant-area skirt section 320, similar to skirt section 120. Additional baffles 338 can be distributed along the length of the reactor 300.

Figure 7B:
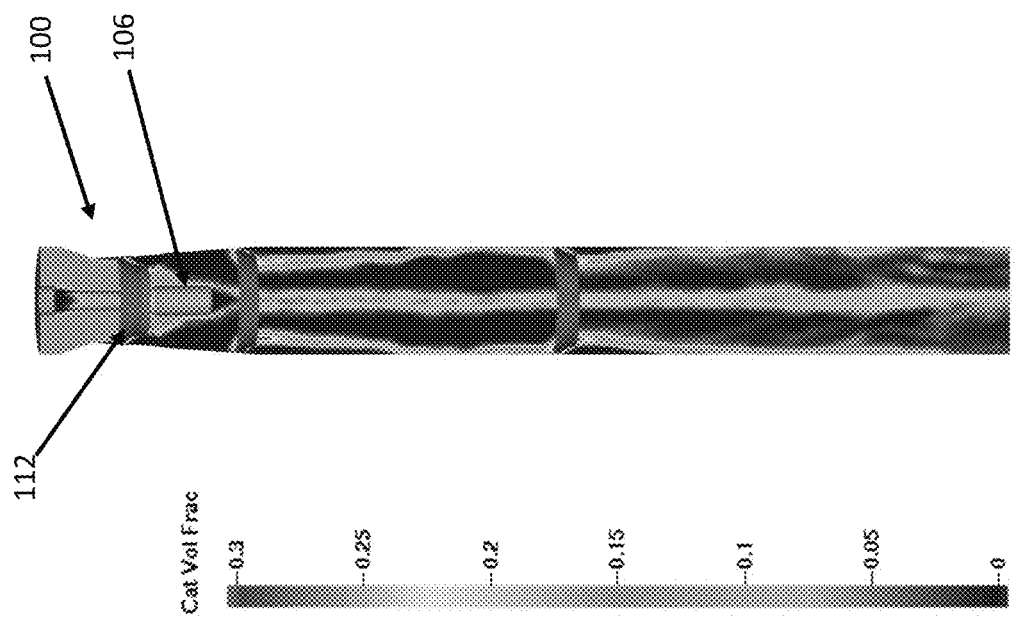
FIG. 7B a CFD result representing an instantaneous plot of axial catalyst distribution along the downflow reactor of FIG. 1, in accordance with the present disclosure, as the catalyst and the feed flow down the reactor.
Figure 7A:
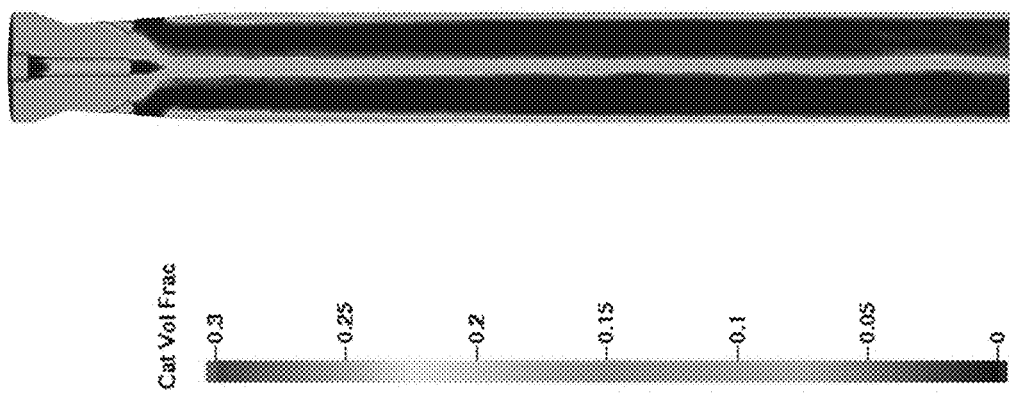
FIG. 7A is a computational fluid dynamics (CFD) result representing an instantaneous plot of axial catalyst distribution along a traditional downflow reactor as the catalyst and the feed flow down the reactor.

As shown by the comparison of FIGS. 7A-7B, reactor devices constructed in accordance with embodiments of the present disclosure, e.g. reactor 100 or 300, provide improved catalyst flow distribution. In FIG. 7A a color CFD model of the axial catalyst distribution for a traditional DFR is shown. In FIG. 7B, a color CFD model of the axial catalyst distribution for a DFR constructed in accordance with the present disclosure, e.g. reactor 100 or 300, is shown. Without the elongated plug 106 and distribution baffle 112, catalyst (shown mostly in green) has the tendency to converge into a central column almost immediately after the termination of the plug. In contrast, with elongated plug 106 and distribution baffle 112, catalyst is more uniformly distributed across the cross-section resulting in improved catalytic cracking of the feedstock (shown in blue).

Figure 8B:
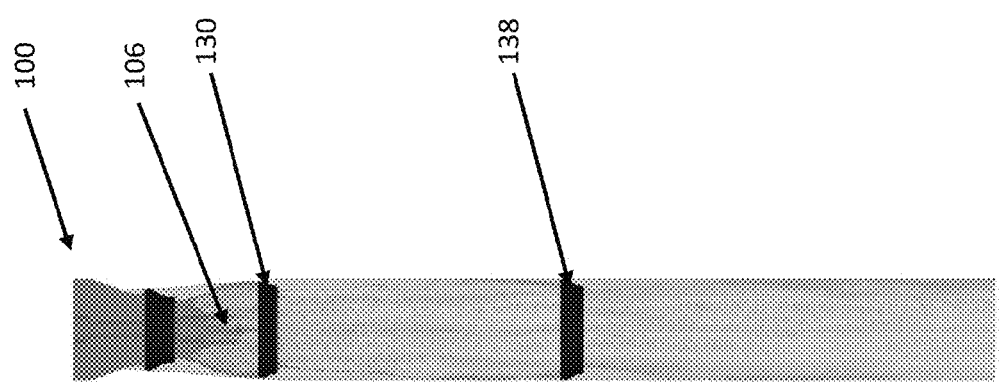
FIG. 8B is a CFD result representing an instantaneous plot of axial catalyst temperature along the downflow reactor of FIG. 1, in accordance with the present disclosure, as the catalyst and the feed flow down the reactor.
Figure 8B:
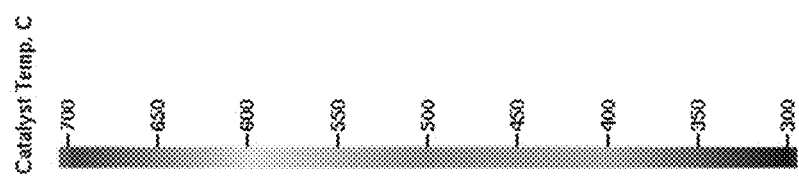
Figure 8A:
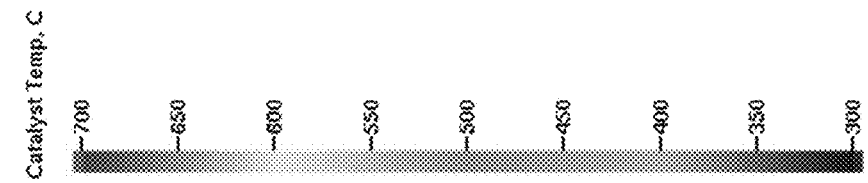
FIG. 8A is a CFD result representing an instantaneous plot of axial catalyst temperature along a traditional downflow reactor as the catalyst and the feed flow down the reactor.

As shown by the comparison of FIGS. 8A-8B, reactor devices constructed in accordance with embodiments of the present disclosure, e.g. reactor 100 or 300, provide improved axial temperature distribution. In FIG. 8A a color CFD model of the temperature distribution for a traditional DFR is shown. In FIG. 8B, a color CFD model of the axial temperature distribution for a DFR constructed in accordance with the present disclosure, e.g. reactor 100 or 300, is shown. With the elongated plug 106 and distribution baffle 112, the almost even yellow of FIG. 8B shows less-hot catalyst bypassing along reactor 100, as compared to FIG. 8A, which has columns of orange (hotter) catalyst in the center and along the periphery. Thus, the effective catalyst to oil mixing is enhanced in the reactor shown in FIG. 8B.

Figure 9A:
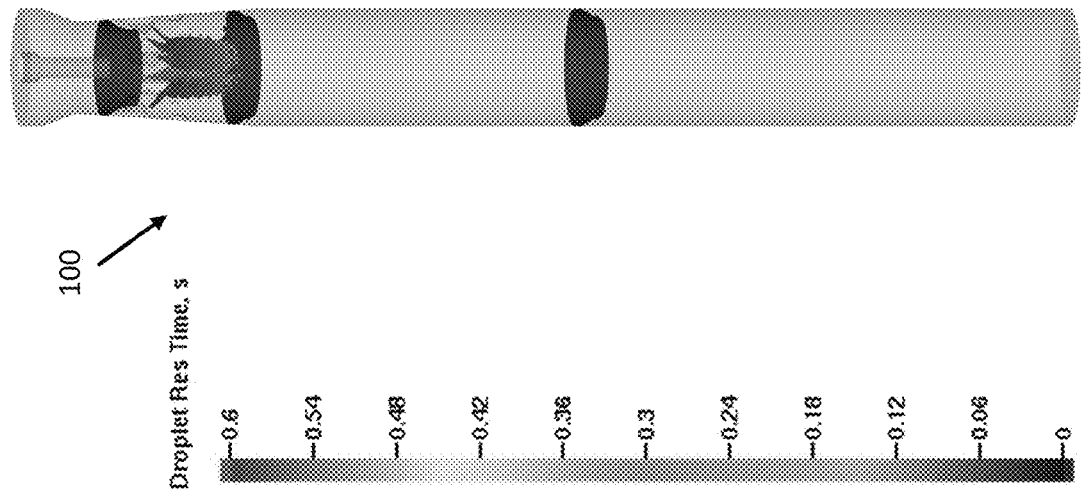
FIG. 9A is a CFD result representing an plot of feedstock droplet vaporization time along a traditional downflow reactor as the catalyst and the feed flow down the reactor.
Figure 9B:
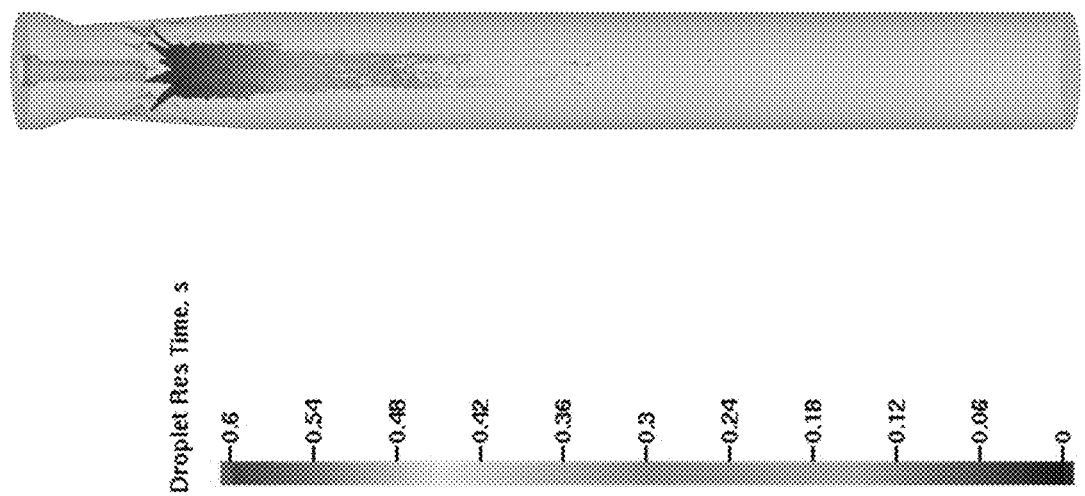
FIG. 9B is a CFD result representing an plot of feedstock droplet vaporization time along the reactor as the catalyst and the feed flow down the reactor in the downflow reactor of FIG. 1, in accordance with the present disclosure.

As shown by the comparison of FIGS. 9A-9B, reactor devices constructed in accordance with embodiments of the present disclosure, e.g. reactor 100 or 300, provide improved droplet vaporization time along the reactor. In FIG. 9A a color CFD model of feedstock droplet vaporization time along the reactor for a traditional DFR is shown. In FIG. 9B, a color CFD model of feedstock droplet vaporization time along the reactor for a DFR constructed in accordance with the present disclosure, e.g. reactor 100 or 300, is shown. The effectiveness of the reactor in accordance with the present disclosure is manifested in FIG. 9B, which shows the droplets (represented in blue) are all essentially vaporized before they reach mixing baffle 130, e.g. within 0.2 seconds, which leaves more time for reacting during the overall residence time of 0.5 to 1 seconds. On the other hand, droplets in FIG. 9A are shown in a variety of colors, some of which indicate a longer residence time as indicated by the scale on the left. This indicates that the effective mixing in the embodiments of the present disclosure, leads to faster feed vaporization than in traditional DFRs. The improved conversion results in more valuable products such as olefins.

The methods and systems of the present disclosure, as described above and shown in the drawings, provide for downflow reactors with more even catalyst distribution, more even temperature distribution and faster feed vaporization, which ensures that the effective catalyst to oil (hydrocarbon) ratio is optimized. While the systems and methods of the subject disclosure have been shown and described with reference to preferred embodiments, those skilled in the art will readily appreciate that changes and/or modifications may be made thereto without departing from the scope of the subject disclosure.

What is claimed is:

1. A downflow reactor comprising:
an outer wall defining an interior reactor space;
an elongated plug within the outer wall having a first end and a second end, defining a longitudinal axis between the first and second ends; and
a distribution baffle positioned at a vertical position between the first end and the second end of the elongated plug configured and adapted to direct hot down flowing catalyst towards a feedstock spray, wherein the distribution baffle includes a converging section and a constant-area section, wherein the converging section converges from an upstream end of the distribution baffle towards a downstream end of the distribution baffle.

2. The downflow reactor of claim 1, wherein an upstream end of the distribution baffle is mounted to an interior surface of the outer wall.

3. The downflow reactor of claim 1, wherein the distribution baffle is formed from at least one of a refractory material or a metallic material.

4. The downflow reactor of claim 1, further comprising at least one feed nozzle positioned on a perimeter of the outer wall configured to spray a feedstock into the interior reactor space.

5. The downflow reactor of claim 4, wherein the second end of the elongated plug terminates at a vertical position below an outlet of the at least one feed nozzle configured and adapted to minimize hot segregated catalyst flow along the elongated plug.

6. The downflow reactor of claim 4, wherein the at least one feed nozzle defines a respective central injection axis, wherein the respective central injection axis intersects an exterior surface of the second end of the elongated plug.

7. The downflow reactor of claim 1, wherein the elongated plug defines an exterior surface, wherein the exterior surface includes at least one projection extending therefrom.

8. The downflow reactor of claim 1, wherein the elongated plug defines a fluid path through a hollow portion of the plug, wherein the fluid path begins at a first end of the plug and terminates at a second end of the plug for injection of steam and/or hydrocarbon feedstock into the interior reactor space.

9. A downflow reactor comprising:
an outer wall defining an interior reactor space;
an elongated plug within the outer wall having a first end and a second end, defining a longitudinal axis between the first and second ends; and
a distribution baffle positioned at a vertical position between the first end and the second end of the elongated plug configured and adapted to direct hot down flowing catalyst towards a feedstock spray, wherein the first end of the elongated plug has a first diameter and the second end of the elongated plug has a second diameter, wherein the second diameter is greater than the first diameter and wherein the second end is positioned downstream from the first end.

10. A downflow reactor comprising:
an outer wall defining an interior reactor space;
an elongated plug within the outer wall having a first end and a second end, defining a longitudinal axis between the first and second ends;
a distribution baffle positioned at a vertical position between the first end and the second end of the elongated plug configured and adapted to direct hot down flowing catalyst towards a feedstock spray; and
a mixing baffle positioned at a vertical position below a terminal end of the second end of the elongated plug.

11. The downflow reactor of claim 10, wherein the distribution baffle includes a converging section and a constant-area section, wherein the converging section converges from an upstream end of the distribution baffle towards a downstream end of the distribution baffle.

12. The downflow reactor of claim 10, wherein the outer wall defines an upstream cylindrical portion and a diverging section downstream from the upstream cylindrical portion, wherein the mixing baffle is positioned at least partially within the diverging section of the outer wall.

13. The downflow reactor of claim 10, wherein an upstream end of the mixing baffle is mounted to an interior surface of a diverging section of the outer wall.

14. The downflow reactor of claim 10, wherein the mixing baffle is formed from at least one of a refractory material or a metallic material.

15. The downflow reactor of claim 10, further comprising at least one distributor positioned at least one of within the mixing baffle or in abutment with the mixing baffle, the at least one distributor configured and adapted to supply at least one of steam, vapor, gas or hydrocarbon feed into the downflow reactor.

16. The downflow reactor of claim 10, wherein the mixing baffle is frustoconical and converges in a downstream direction toward a central axis of the outer wall.

17. A downflow reactor comprising:
an outer wall defining an interior reactor space;
an elongated plug within the outer wall having a first end and a second end, defining a longitudinal axis between the first and second ends; and
a distribution baffle positioned at a vertical position between the first end and the second end of the elongated plug configured and adapted to direct hot down flowing catalyst towards a feedstock spray, wherein the outer wall defines an upstream cylindrical portion and a diverging section downstream from the upstream cylindrical portion, wherein the downflow reactor further comprises at least one lower baffle positioned at a vertical position below the diverging section of the outer wall.

18. The downflow reactor of claim 17, wherein the at least one lower baffle is frustoconical and converges in a downstream direction toward a central axis of the outer wall.

19. The downflow reactor of claim 17, wherein the at least one lower baffle is formed from at least one of a refractory material or a metallic material.

20. The downflow reactor of claim 17, further comprising at least one distributor positioned at least one of within the lower baffle or in abutment with the lower baffle, the at least one distributor configured and adapted to supply at least one of steam, vapor, gas or hydrocarbon feed into the downflow reactor.

21. The downflow reactor of claim 17, wherein the at least one lower baffle is a plurality of lower baffles positioned at different vertical positions along the outer wall, each at a vertical position below the diverging section of the outer wall.

22. A downflow reactor comprising:

an outer wall defining an interior reactor space;

an elongated plug within the outer wall having a first end and a second end, defining a longitudinal axis between the first and second ends; and a distribution baffle positioned at a vertical position between the first end and the second end of the elongated plug configured and adapted to direct hot down flowing catalyst towards a feedstock spray, wherein the elongated plug defines an exterior surface, wherein the exterior surface includes at least one projection extending therefrom, wherein the at least one projection is a series of helical vanes.

23. A downflow reactor comprising:

an outer wall defining an interior reactor space;

an elongated plug within the outer wall having a first end and a second end, defining a longitudinal axis between the first and second ends; and a distribution baffle positioned at a vertical position between the first end and the second end of the elongated plug configured and adapted to direct hot down flowing catalyst towards a feedstock spray, wherein the elongated plug defines an exterior surface, wherein the exterior surface includes at least one projection extending therefrom, wherein the first end of the elongated plug has a first diameter and the second end of the elongated plug has a second diameter, wherein the second diameter is greater than the first diameter and wherein the second end is positioned downstream from the first end, wherein the at least one projection extends from the exterior surface on the second end.

* * * * *